United States Patent
Soper et al.

(10) Patent No.: US 7,144,120 B2
(45) Date of Patent: Dec. 5, 2006

(54) DECOUPLABLE IMAGE PROJECTION DEVICE FOR USE WITH DOCKING STATIONS

(76) Inventors: Kevin James Soper, 2 Doradus Avenue, Hope Valley, South Australia 5090 (AU); Phillip Brendan Banks, 16 Ariadne Crescent, Modbury Heights, South Australia 5092 (AU); Peter Hugh Nankivell, 47 Ridgeway Drive, Flagstaff Hill, South Australia 5159 (AU); Luceille Outhred, 19 Koonga Avenue, Prospect, South Australia 5082 (AU)

( * ) Notice: Subject to any disclaimer, the term of this patent is extended or adjusted under 35 U.S.C. 154(b) by 0 days.

(21) Appl. No.: 10/804,642

(22) Filed: Mar. 19, 2004

(65) Prior Publication Data

US 2004/0246450 A1  Dec. 9, 2004

Related U.S. Application Data

(63) Continuation of application No. PCT/AU02/01306, filed on Sep. 20, 2002.

(30) Foreign Application Priority Data

Sep. 20, 2001  (AU) .................... PR7771

(51) Int. Cl.
*G03B 21/26* (2006.01)
*G03B 21/22* (2006.01)

(52) U.S. Cl. .............. 353/94; 353/119; 353/122
(58) Field of Classification Search .......... 353/94, 353/8, 20, 21, 29–31, 34, 37, 71–74, 77, 353/78, 88, 89, 119, 122; 349/7, 8; 359/443, 359/449, 460; 348/744
See application file for complete search history.

(56) References Cited

U.S. PATENT DOCUMENTS 5,664,859 A * 9/1997 Salerno et al. .............. 353/119
5,993,012 A * 11/1999 Buchanan et al. .......... 353/119

* cited by examiner

*Primary Examiner*—W. B. Perkey
*Assistant Examiner*—Rochelle Blackman
(74) *Attorney, Agent, or Firm*—Francis Law Group

(57) ABSTRACT

An image projector assembly including a mountable image projection device and a docking station adapted for mounting said device. The image projection device is the optical engine and typically includes an image generating apparatus and a light source to project through said apparatus to thereby provide for an image. The docking station includes a signal generating apparatus to provide a signal to the image generating apparatus representative of a visual image and includes a power source for the optical engine. The demountable aspect of the assembly provides for easy replacement and maintenance of the optical engine as well as its portability to use in different optical engines thereby saving on cost.

2 Claims, 6 Drawing Sheets

DECOUPLABLE IMAGE PROJECTION DEVICE FOR USE WITH DOCKING STATIONS

This application is a continuation application of International Application No. PCT/AU02/01306, filed Sep. 20, 2002, which claims priority from Australia Application No. PR7771, filed Sep. 20, 2001.

BACKGROUND OF THE INVENTION

The present invention relates to imaging apparatus and in particular to the decoupling and docking arrangements of a decouplable image projection device that can be used with different types of docking stations.

Image projection apparatus have been known for a number of years and fall into two distinct categories, the rear, and forward projection types. For example, a conventional television receiver is a rear projection apparatus, whilst a conventional cinema projector is a forward projection apparatus.

The difficulty with all of these projection apparatus is that they require sophisticated and complex optical engines and electronic components that are in-built into the apparatus. For that reason, the apparatuses are both generally heavy and cumbersome, or fragile and vulnerable. Frequently these projection apparatus arm mounted above head height giving rise to Occupational Health and Safety issues for those undertaking installation.

Because of this, projection apparatus are seldom moved and typically a business or home or entertainment venue may end up purchasing and owning several different projection apparatus located in different areas for different uses even though they may not all be used at the one time.

Having multiple projection apparatus may not be too inconvenient, but it is rather an expensive option. One of the most expensive parts in a projection apparatus is the optical engine that produces the image subsequently projected.

Some image projection devices use a Liquid crystal Display (LCD) or other similar display devices. These can degrade through exposure to ultra-violet rays, high heat, or cigarette smoke, requiring upgrades, or replacement of the LCD. This can be somewhat difficult and cumbersome to carry out and in some cases not even possible requiring replacement of the whole unit or at the very least expensive repair. In many image projection devices upgrades or replacement LCD's or other similar display devices need to therefore be carried out by specialists.

It is an object of the present invention to overcome at least some of the abovementioned problems or provide the pubic with a useful alternative.

It is a further object of the present invention to provide for a light-weight decouplable image projection device enabling upgrades to be carried oat with minimum effort and within a safe environment by the removal of electrical hazards, or the weight shifting hazards normally associated with lifting and removing heavy larger projection apparatus.

It is still a further object of the present invention to provide for an image projection device that is easily serviced and is upgradeable.

The present invention therefore provides for a projector and/or an optical engine that is decouplable from the power supply and signal sources, and is used in a docking type arrangement that overcomes at least some of the abovementioned problems or provides useful alternatives.

The decouplable image projection device furthermore, may be easily manufactured, and provides significant cost savings to whilst ensuring flexibility of image projection, by enabling the choice of a number of parameters such as but not limited to image resolution, lumens, and power source.

SUMMARY OF THE INVENTION

Therefore in one aspect of the invention though this need not be the only or indeed the broadest format there is proposed an image projector assembly including:

a mountable image projection device;

a docking station adapted for mounting said device wherein said device includes an image generating apparatus and a light source to project through said apparatus to thereby provide for an image and wherein said docking station includes a signal generating apparatus to provide a signal to the image generating apparatus representative of a visual image.

Preferably said docking station further includes an audio reproducing means.

In preference said projection device includes a plurality of male mating members adapted to engage correspondingly shaped female mating members on said docking station.

Preferably said docking station provides power to said projection device.

Preferably said docking station includes a selection means to select the Voltage input used by the projector, said choice depending on the voltage provided by the docking station.

In preference wherein said projection device includes a liquid crystal display and a lamp, said lamp transmitting light through the liquid crystal display for illuminating a surface.

In a further form of the invention there is proposed an image projector assembly including:

a docking station having a housing, a power output source and an output communication port;

a decouplable projection device adapted to dock with said docking station and including a housing having an input power source adapted to engage said power output source and an input communication port adapted to engage said output communication port.

Preferably said assembly further includes at least two docking stations.

In preference the assembly further includes a global positioning system.

In a preferred embodiment said projection device includes an image manipulation means that can change the parameters of the image including but not limited to reversing the image, mirroring the image and rotating the image whereby the user can select what image is to be projected depending on whether the assembly is a front or rear projection type assembly.

In preference said assembly includes at least one pivotable docking station.

In a still further form of the invention there is proposed a decouplable image projection device adapted to be removably docked to a station, said image projection device producing an image to be displayed, said station providing said device with electrical power and a video signal of the image to be projected.

In preference said decouplable image projection device includes a television reception capabilities.

In preference said decouplable image projection device includes a navigational system providing at least the location of said device.

In preference said decouplable image projection device includes a navigational system having a sonar system.

In preference said decouplable image projection device includes an LCD display or other similar technologies that are adaptable to produce an image by electromagnetic radiation passing therethrough.

In preference said decouplable image projection devices includes a selection means adapted to select the voltage at which said device operates, said voltage chosen on the basis of the operating voltage of the docking station.

In preference said docking station is located in a rear projection apparatus having a rear projection surface screen.

In preference said docking station is mounted in a vehicle.

BRIEF DESCRIPTIONS OF THE DRAWINGS

The accompanying drawings, which are incorporated in and constitute a part of this specification, illustrate several implementations of the invention, and, together with the description, serve to explain the advantages and principles of the invention. In the drawings, FIG. 1 is a perspective view of the decouplable image projection device in a rear projection arrangement;

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and the scope of the invention. Whenever possible, the same reference numbers will be used throughout the drawings and the following description to refer to the same and like parts.

Figure 1:
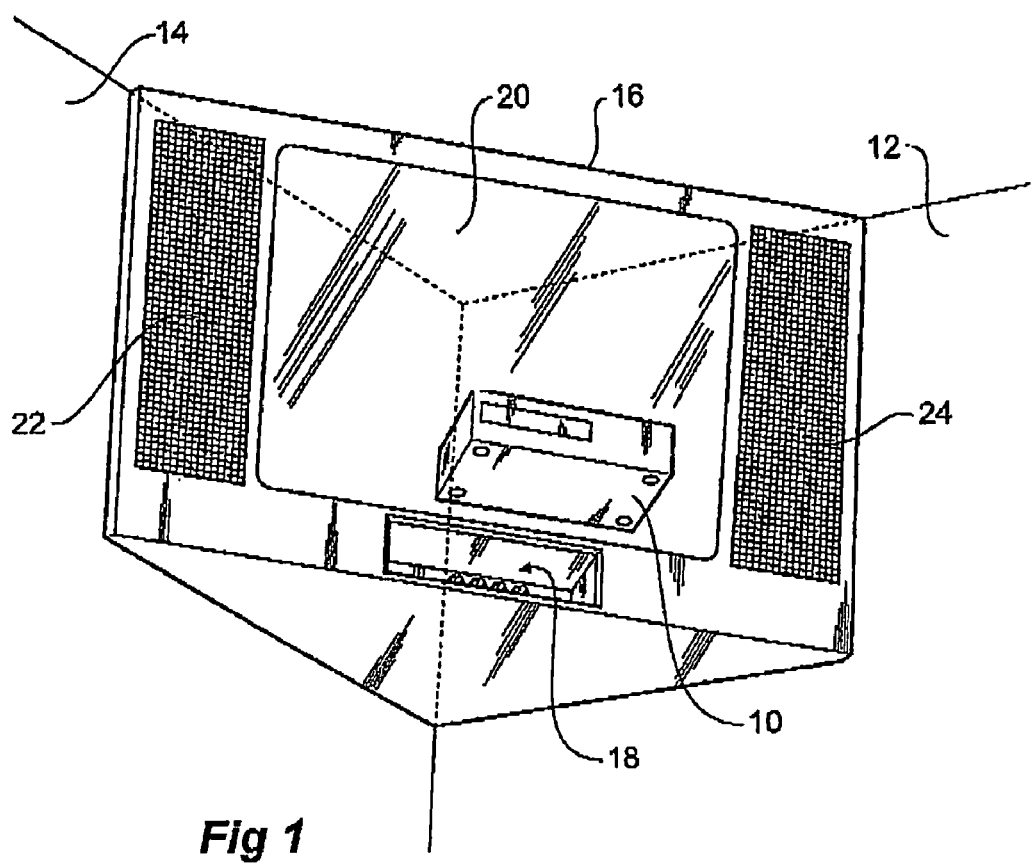

FIG. 1 illustrates a decouplable image projection device 10 being mounted in a corner unit defined by two walls 12 and 14. The corner unit or rear projection arrangement 16 includes a docking station 18, a conventional rear projection screen 20, and several speakers 22 and 24. The decouplable image projection device 10 is adapted to be mounted in the docking station 18 located in the rear projection arrangement 16. The decouplable image projection device 10 includes image generating optical components and the relevant electronics. The decouplable image projection device 10 constructs the image that is projected on the rear projection screen 20.

Figure 2:
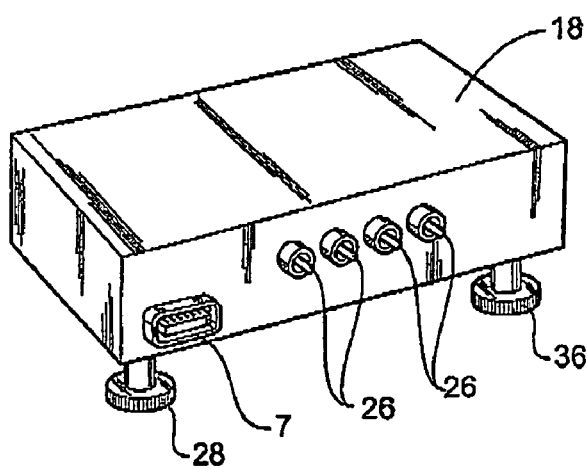
FIG. 2 is a front perspective view of the docking station illustrating the mating segment.
Figure 3:
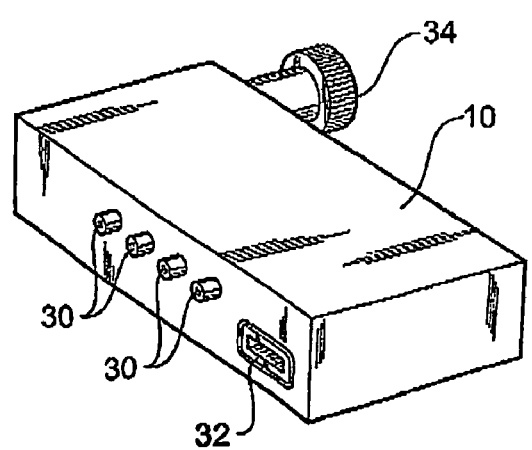
FIG. 3 is a rear perspective view of the back of the decouplable image projection device of FIG. 1.

As shown in further detail in FIGS. 2 and 3, the docking station 18 may include several types of connectors including male video and audio connectors 26, and computer interface 28 that mate with the projection device 10 female counterparts 30 for the audio and video connectors and computer connector 32. This enables a signal from the docking station 18 to be fed into the decouplable image projection device 10 to produce the desired image that is subsequently shown on the rear projection screen 20.

The image projection device may include various optical lenses to produce for an appropriate image including focussing lens 34. The docking station may also include various devices to assist in the projection of the image including adjustable feet 36.

Figure 4:
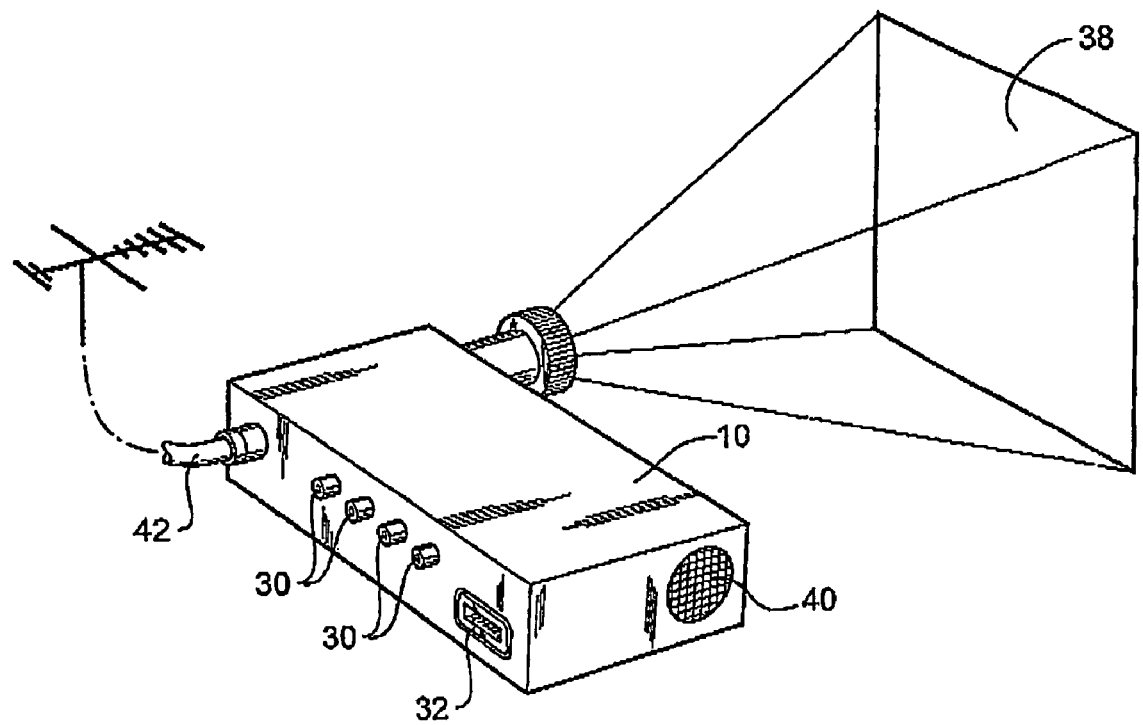
FIG. 4 is a rear perspective view of the decouplable image projection device of FIG. 1 when projecting to a screen.

As further illustrated in FIG. 4, the decouplable image projection device 10 includes the necessary optical engine to produce the image 38 to be displayed. Although not individually shown, the optical engine may include a LCD or similar display technology, an objective lens, driver and receiver electronics, and other individual components that produce the image. The device may further include a cooling means such as fan 40 and an input for an antenna 42.

Figure 5:
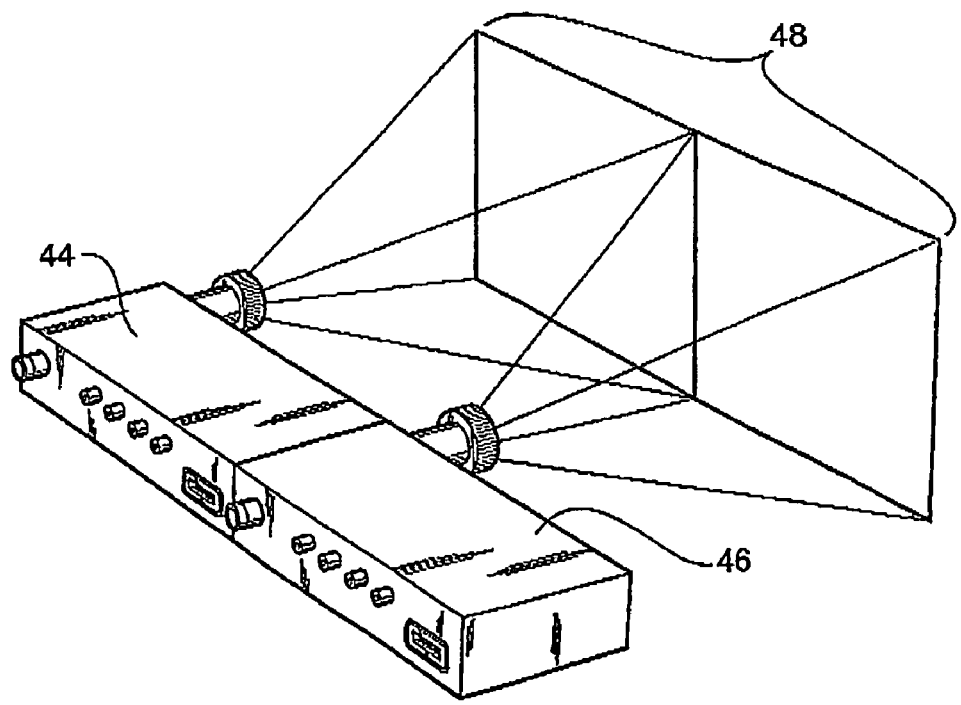
FIG. 5 is a perspective view of an alternate embodiment of a dual decouplable image projection device project to a screen.

FIG. 5 illustrates two decouplable image projection devices 44 and 46 that may be coupled to produce one complete image 48. This may be appropriate where one would require to project an image over a larger surface area so that it needs to be projected in two parts, each part by a separate decouplable image projection device 44 and 46.

Figure 6:
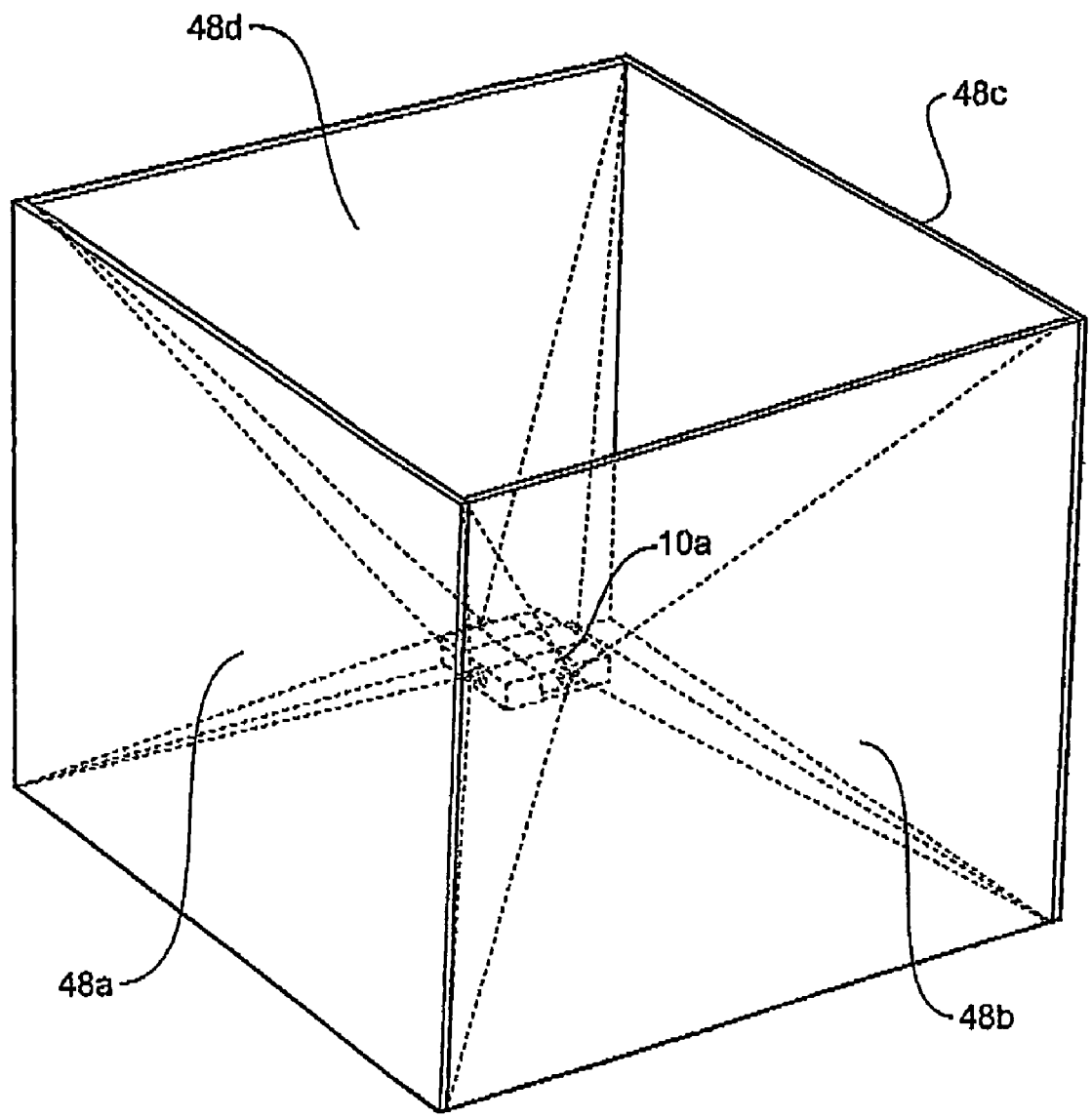
FIG. 6 is a schematic perspective view of four decouplable image projection devices mounted in a multi-way docking station.
Figure 7:
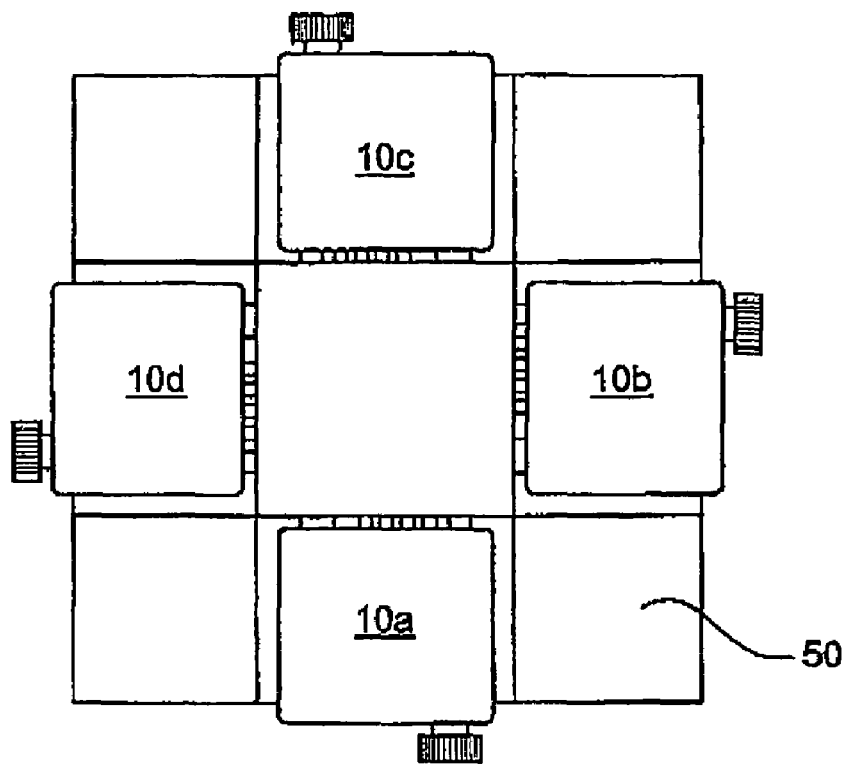
FIG. 7 is a plan view of four decouplable image projection devices, docked within a multi-way docking station.
Figure 8:
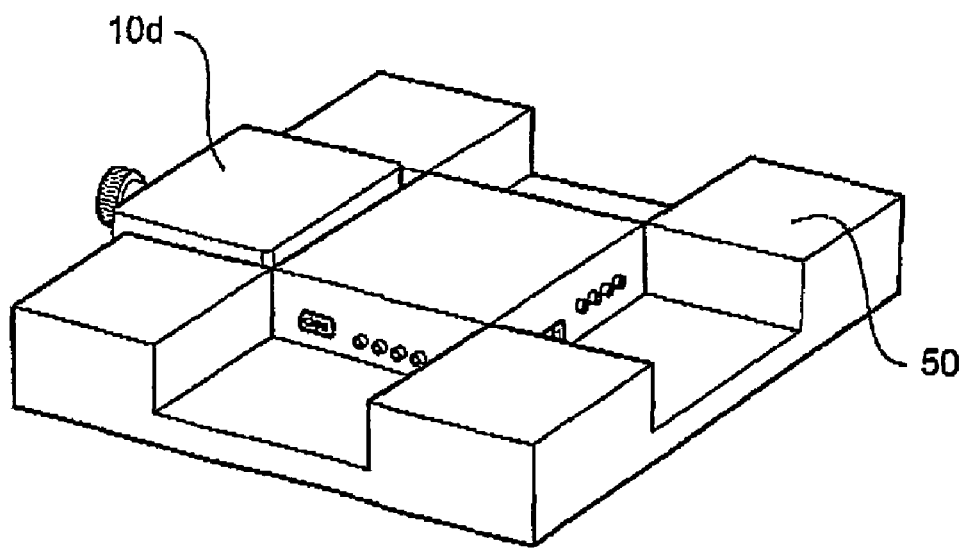
FIG. 8 is a schematic perspective view illustrating a single decouplable image projection device docked in a multi-way docking station.

In a preferred embodiment of the invention illustrated in FIGS. 6–8, four decouplable image projection devices 10a, 10b, 10c, and 10d may be used to provide four images directed in four different directions in this particular illustration, the four decouplable image projection devices may be used in a rear projection apparatus providing four right-angled images 48a, 48b, 48c, and 48d. This type of arrangement may be particularly useful in a large entertainment venue or a retail outlet where an image is to be provided in different directions. The four devices are mounted in a multi docking station 50.

Accordingly the skilled addressee will appreciate that the print invention provides for either a rear projection or forward projection apparatus by the use of a mountable decouplable image projection device 10, which means that it may be used to provide an image to different types of projection apparatus.

Since the decouplable image projection device 10 is removable the cost of the projection unit 16 itself is far less than is conventionally possible for the same number of projection outputs and allows the decouplable image projection device 10 to be used either in the rear 20 or front projection modes 38. Further, the docking station 18 enables a total projection apparatus that has a high degree of interactivity, ruggedisation, and portability. The use of four or more housings allows four images (and thus 360 degrees viewing to be achieved at the same time. It is also to be understood that the decouplable image projection device 10 may include other features such as speakers mounted on 'wings'.

To assist in achieving this portability of the device 10, the docking station 18 includes various connection means including, but not limited to A computer interface (data in)
Composite video input
Audio in/out
ROB input
Low voltage in (12 v/24 v)
RP in The docking station may also include other features such as a DVD player, audio reproduction devices including amplifiers and speakers, and external antenna sockets.

Figure 9:
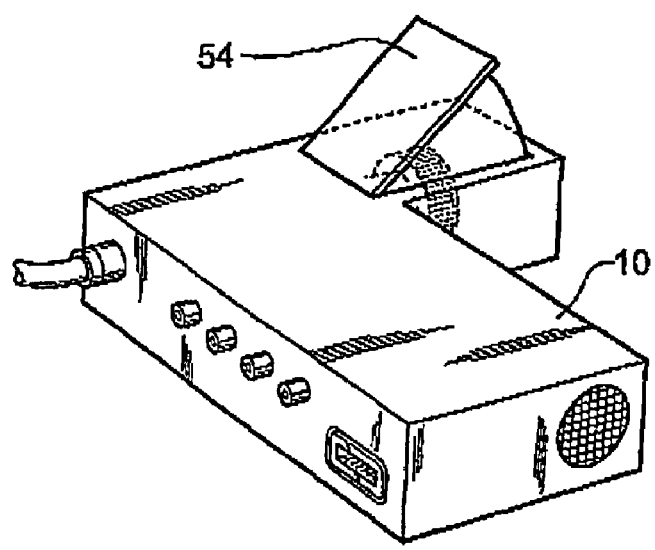
FIG. 9 is a plan view illustrating one decouplable image projection device docked and a mounted image projection system attached.
Figure 10:
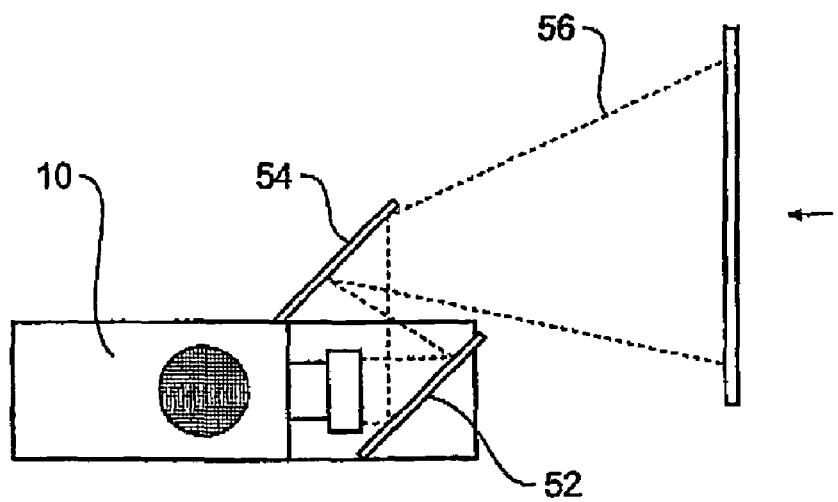
FIG. 10 is a schematic perspective view of a decouplable image projection device docked and a mounted image projection system attached.

It is also to be understood that the decouplable image projection device 10 may include other features such as an image projecting system wherein a mirror or mirrors are mounted to reflect the image out of the enclosed space to a larger viewing screen being either a rear projection or forward projection location. Such an arrangement is illustrated in FIGS. 9 and 10 wherein the use of a static mirror 52 and pivotable mirror 54 may be used to project the image 56 from the device 10.

The skilled addressee will now appreciate that the use of a portable decouplable image projection device 10 that is adapted to be dockable within a viewing apparatus 16 or 50 enables far greater flexibility than has hitherto been known. A consume or purchaser may choose to purchase several different sizes of the docking station 18 and/or rear projection arrangement 16 and 50 and/or decouplable image projection devices 10, all of which are adaptable to be used interchangeably. The decouplable image projection device 10 is adapted to be portable and ultra light and designed to be ruggedised and is removably mountable in different docking stations. This enables a hitherto unknown flexibility in projection apparatus for the decouplable image projection device 10 may be used in a rang of different projection apparatus.

In the normal operations of a convention or conference centre multiple projectors are required. Not all are required for the same conference room or seminar room and therefore are subject to be moved around as require. As previously outlined this is cumbersome, not cost effective and subjects the equipment that is fragile to risk. Lifting the equipment adds an additional Occupational Health and Safety issue for installers.

One can therefore now appreciate that a home or a convention or conference facility may have multiple docking stations that require a decouplable image projection device 10 to provide an image. Not all docking stations will be used at the one time and one simply needs to select the required decouplable image projection device—depending on resolution requirements—and insert it into the previously aligned and fixed docking station. Thus, a home or convention or conference facility may be able to offer the flexibility of a user in any given situation selecting from a low resolution and lower output lamp, or a higher resolution and a higher output lamp, or a very high-resolution image and a very high output lamp. That is to say, all docking stations are compatible with the full range of decouplable image projection devices and each can be interchanged at will.

In a convention or conference centre facility for example this would greatly save on the cost of equipment and has risk management advantages for quality of display, protection of equipment and safe working procedures for personnel. Within a household environment parents may elect to use the high quality decouplable image projection device within a discrete home theatre environment and the lower quality decouplable image projection device within the family room but on a particular occasion such as a birthday party or sleepover, they may dock the lower quality decouplable image projection device into the docking station in the home theatre environment where the other household members may enjoy their entertainment and take the higher quality resolution decouplable image projection device to the family room and watch their preferred television or video or DVD.

Further, not only does the present invention enhance options for the high end professional user, but with the increased demand in home theatre, it means for the average consumer that by purchasing the one or more decouplable image projection devices, and multiple docking stations, it would be possible to provide projection (both rear and front) in several rooms of the home, providing total flexibility of image projection, by enabling the choice of image resolution, lumens and power source and without moving heavy equipment.

The advantages of this include: portability of equipment; enhanced viewing possibilities (i.e. forward projection in a dimmed home theatre environment or rear projection in full ambient light), customized power supply requirements for 12V or 24V environments; and total upgradability in the event of the LCD or other display device being degraded or damaged.

Further, the decouplable image projection device may be mounted within leisure craft and watercraft or mobile homes and caravans, providing a totally removable device for home entertainment, vehicle entertainment, and personal entertainment during leisure pursuits.

Currently within leisure and other watercraft, a boat may have a variety of display panels for a number of navigational devices (eg depth sounder, GPS and radar) and possibly one for entertainment purposes (eg television set). By using the decouplable image projection device with docking station all information sources could be electronically combined with all images produced being projected onto the one screen.

Either mechanical and electrical componentry devices may select the information source being used by the decouplable image projection device, and may be menu driven. The system also includes electronics within the system to display an image on the screen in an appropriate orientation, thus avoiding upside-down or back-to-front images in the various uses of the system. Thus, the decouplable image projection device has a switching mechanism or electronics system within it for all possible orientations of the image.

The advantages of this for leisure and other craft would be space saving features enabling a larger, more easily readable screen to be used. Furthermore, with combined electronics and power sources there would be the added advantage of weight saving.

Used in conjunction with image reflecting devices such as a periscope the user would have a two-way viewing option from either within the cabin or outside the cabin. Thus, the image may be viewed via rear projection methods to the display panel normally located near the helm for navigation purposes alternatively, using peripheral devices, a significantly larger image could be viewed using forward projection principles onto a screen inside the cabin where the ambient light is controllable.

As most leisure craft are fitted with a television set (and the decoupling projection device may have television reception capabilities) this arrangement provides additional benefits of further reduction of weight; increase of space availability; larger image availability; access to all navigational information from within the cabin.

Thus, the video source may be a computer, a video player, a television receiver, geographic positioning systems, sonar devices, or any other composite video source. Likewise, the signal may be received via a direct wire or a wireless system.

Whereas specific 'rugged' laptop computers have been developed for use within Defence and Emergency Services environments to be used with customized software for battle command stations, briefings for defence and emergency services and other similar functions, there has, to date been no 'rugged' projection equipment developed.

In fact, the fragility of video projection systems is a particularly limiting factor in their use in any harsh and/or mobile environment.

The decouplable image projection device and multiple docking stations according to the present invention have significant implications for Defence and Emergency Services, including customized power supply requirements for 12V or 24V environments within jeeps, tanks, armoured personnel carriers, briefing tents with briefing tables and within Battle Command Headquarters. The decouplable image projection device may be further 'ruggedised' with specifically designed optical engines.

The present invention has particular relevance for the retail industry where the use of high mounted multiple docking stations could maximize the benefits of in-store advertising and promotions. Furthermore, the decouplable image projection device could be moved from location to location within the store without necessitating the lifting of heavy and/or cumbersome equipment—thus providing Occupational Health and Safety advantages.

Figure 11:
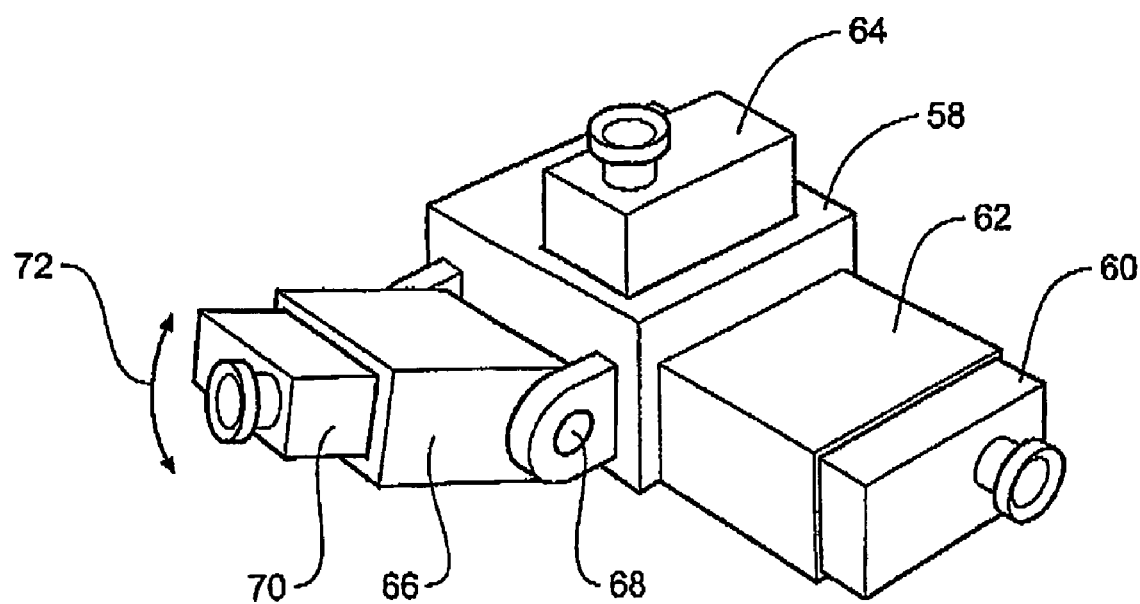
FIG. 11 is a schematic perspective illustrating a multi-dimension image projection device.

It is not intended to limit the present invention to a docking station of the type where the projection devices project in the same plane. Thus as illustrated in FIG. 11, there is shown a docking station 58, first projection device 60 mounted to a socket 62 of the station 58, a second projection device 64 mounted on top of the station and projecting upwards compared to the first docking station 60. The station may also include a third port 66 adapted to pivot around coupling 68 and supporting decouplable projection device 70. The pivoting enables the device 72 to pivot in direction 72 controlling the direction of the projected image.

In Conference and Convention Centres multiple docking stations could be installed in each room/theatre at the exact alignment for minimal cost. A variety of decouplable image projection devices, of differing quality resolutions could be available for use on an as needs basis, and the installation would be simple, cost effective (no alignments necessary) and provide Occupational Health and Safety advantages.

Further advantages and improvements may very well be made to the present invention without deviating from its scope. Although the invention has been shown and described in what is conceived to be the most practical and preferred embodiment, it is recognized that departures may be made therefore within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. An image projector assembly, comprising:
   a housing having at least first and second docking stations, said first docking station having a first power output source and a first output communication port, said second docking station having a second power output source and a second output communication port; and
   a decouplable projection device adapted to dock with said first and second docking stations, said projection device including a housing having an input power source adapted to engage said first and second power output sources and an input communication port adapted to engage said first and second output communication ports.

2. An image projector assembly, comprising;
   a docking station having a housing, a power output source, and an output communication port;
   a decouplable projection device adapted to dock with said docking station, said projection device including a housing having an input power source adapted to engage said power output source and an input communication port adapted to engage said output communication port; and
   a global positioning system.

* * * * *